Figure 1:
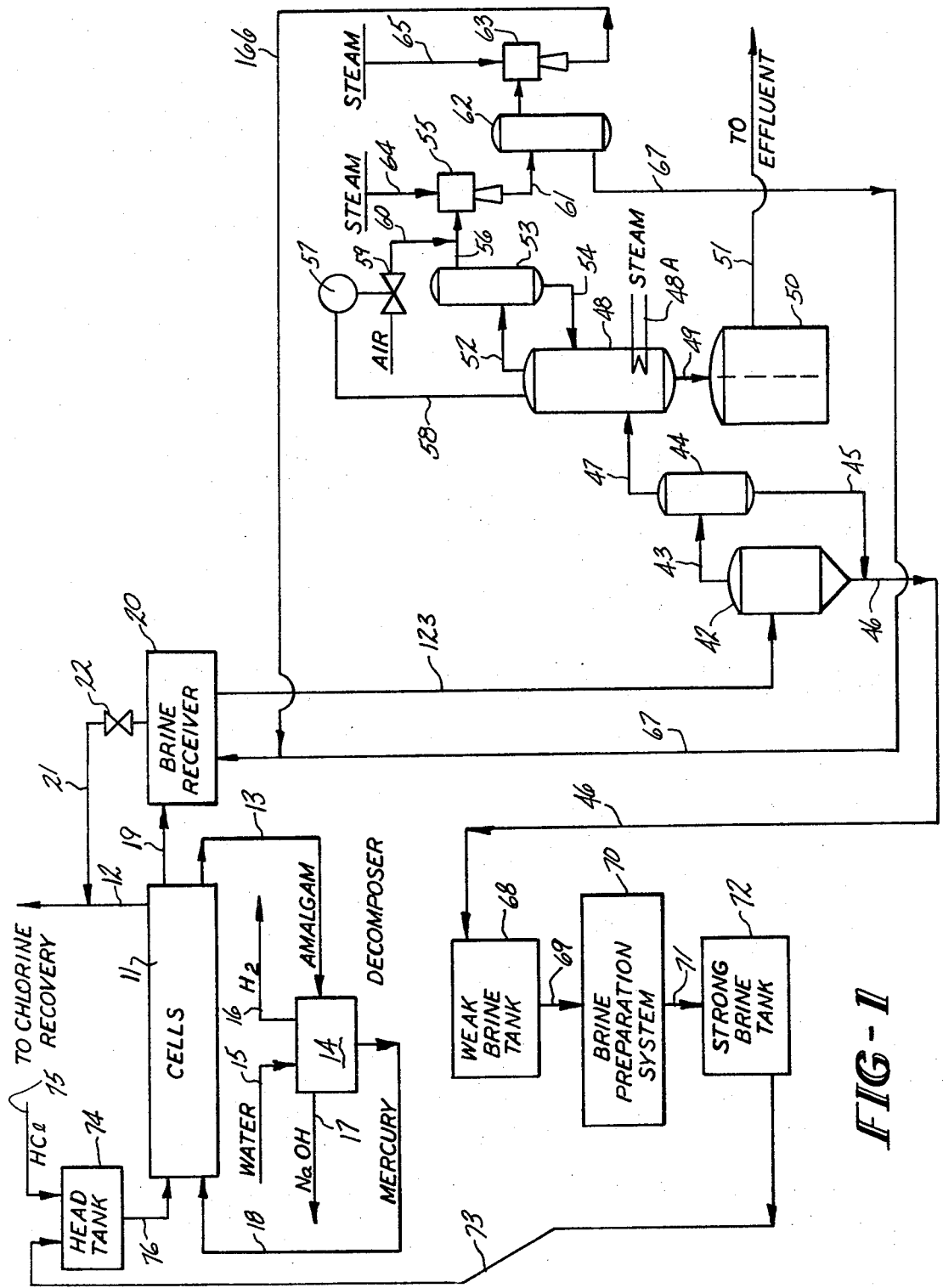

United States Patent
Fabiano

[15] 3,668,087
[45] June 6, 1972

[54] BRINE DECHLORINATION
[72] Inventor: Leonard A. Fabiano, Trumbull, Conn.
[73] Assignee: Olin Corporation
[22] Filed: Feb. 3, 1971
[21] Appl. No.: 112,316

[52] U.S. Cl. ............................................... 204/99, 204/128
[51] Int. Cl. .................................... C01d 1/08, B01k 1/00
[58] Field of Search ........................... 204/98, 99, 100, 128

[56] References Cited

UNITED STATES PATENTS

| | | | |
|---|---|---|---|
| 3,052,612 | 9/1962 | Henegar et al. | 204/99 X |
| 3,115,389 | 12/1963 | Deriaz | 204/99 X |
| 3,420,757 | 1/1969 | Friemel et al. | 204/99 |
| 3,446,719 | 5/1969 | Nicolaisen | 204/99 |

Primary Examiner—John H. Mack
Assistant Examiner—D. R. Valentine
Attorney—Gordon D. Byrkit, Donald F. Clements, Thomas P. O'Day, Eugene Zagarella, Jr. and F. A. Iskander

[57] ABSTRACT

In the vacuum dechlorination of acidic alkali metal chloride brine effluent from a mercury cathode electrolytic cell, chlorine is recovered and an effluent environmentally acceptable is produced using steam jet vacuum with rectification to remove chlorine to acceptable amounts in the aqueous effluent.

4 Claims, 2 Drawing Figures

BRINE DECHLORINATION

This invention relates to the dechlorination of weak brines effluent from electrolytic cells, especially mercury cathode cells, the recovery of the chlorine removed from such brines and discharge of water containing environmentally acceptable amounts of free chlorine.

Chlorine is commercially produced principally by the electrolysis of brine in electrolytic cells. The cells may be of the diaphragm or mercury type. The brine is usually sodium chloride brine but other alkali metal chlorides, particularly potassium chloride or lithium chloride, may be electrolyzed to obtain chlorine and a caustic alkali. The invention is applicable to the electrolysis of brines of any of the alkali metal chlorides. The gas from electrolytic brine cells is rich in chlorine but is saturated with water vapor. It may also be contaminated by small proportions of hydrogen, carbon dioxide and air (nitrogen and oxygen). The chlorine stream is cooled, dried, compressed and further cooled in order to liquefy the chlorine.

In the operation of an electrolytic chlorine plant using mercury cells, the weak brine effluent from the cells is partially depleted in salt content and saturated with chlorine. It is ordinarily treated for recycle to the cells by dechlorination, suitably with vacuum followed by blowing with air, resaturation by contact with solid salt, purification, particularly with respect to iron and other metals introduced as contaminants with the salt, by the addition of caustic soda, soda ash and/or barium carbonate or barium chloride followed by settling and/or filtration to remove the precipitated metal compounds. The purified alkalized brine is acidified preferably to a pH of about 3 as described in detail in U.S. Pat. No. 2,787,591 and recycled to the cells.

The dechlorination of the effluent brine is partly for the purpose of recovering chlorine and partly to reduce the corrosiveness of the brine to equipment used in fortifying and purifying the brine for recycle to the cells. Steam jets are the cheapest and most effective vacuum producing means for this service. However, complete dechlorination is uneconomical when the cost of dechlorination exceeds the value of the recovered chlorine plus the cost of replacing corroded equipment or the cost of avoiding corrosion by chemical means. While it is cheaper in some circumstances to discharge unrecovered chlorine to the environment, this is a currently unacceptable practice. It is therefore a principal object of this invention to provide a method for reducing the chlorine content of the effluent to such levels that residual chlorine discharged from the operation is below limits acceptable to avoid environmental contamination of rivers, streams, lakes or other bodies of water or ground or air and to accomplish the above objects economically.

These and other objects of this invention are accomplished by vacuum dechlorination using steam exhaust to produce the required vacuum including the steps of:

1. vaporizing overhead from said brine a stream of water and chlorine containing a major proportion of the chlorine dissolved in said brine;
2. recycling the resulting dechlorinated brine to a brine preparation system for fortification, purification and reuse in said cell;
3. fractionating said overhead stream of water and chlorine to provide a second overhead stream of water and chlorine and an aqueous bottom product containing less than 250 parts per million of chlorine;
4. condensing said second overhead stream of chlorine and water together with the condensate from the steam exhaust and recycling the resulting mixed condensates by combining them with said acidic brine from said cells.

The objects of this invention are further accomplished in a particularly advantageous mode of vacuum dechlorination in two stages wherein the second stage is the method described above and the first stage is a preliminary stage wherein the steps are:

a. vaporizing overhead from said brine from said cell a first stream of water and chlorine containing a major proportion of the chlorine dissolved in said brine;
b. condensing said first overhead stream of chlorine and water together with the condensate from the steam exhaust and recycling the resulting mixed condensates by combining them with said acidic brine from said cells;
c. charging the resulting partially dechlorinated brine to said second stage.

In this specification and claims the term "alkali metal chloride" includes all of the alkali metal chlorides, lithium, sodium, potassium, rubidium and cesium but of all these, sodium chloride is the most common and preferred embodiment.

In the single stage mode of practicing the invention, the brine from the cells is charged, suitably and initially to a flash chamber at a pressure below about 10 inches of mercury, preferably from about 3 to 10 inches of mercury. The resulting temperatures are from about 100° to 180° F. The dechlorinated brine is returned to the brine fortification and purification operation for reuse in the cells. Carry-over is separated from the overhead stream and combined with the residual dechlorinated brine. The overhead stream is then fractionated in a column suitably having from about 1.5 to 2.5 theoretical plates depending on operating pressure, purity required and condenser design. The pressures and temperatures in the rectifier column are maintained to produce an aqueous bottom product containing less than a predetermined content of chlorine which, after neutralization is acceptable for discharge to the environment. The determination of these operating variables is well within the skill of a qualified chemical engineer. However, for example, a bottom product containing 30 ppm of chlorine was produced in a rectifier column having two theoretical plates at a bottom temperature of 137.5° F. and a pressure of 5.86 inches of mercury.

The overhead from the rectifier column is cooled in a condenser and liquid condensate is returned to the column as reflux. Uncondensed chlorine and water are injected into the steam jet. The steam condensate containing the dissolved chlorine is returned to the outlet brine receiver. Advantageously, uncondensed gases are passed to a second steam jet and the condensate therefrom is returned to the outlet brine receiver.

In the two stage operation, a first, preliminary stage of dechlorination is provided in which the pressure on the brine effluent from the cells at temperatures of 165° to 215° F. is reduced to below about 14 inches of mercury, suitably about 10 to 14 inches of mercury. This reduces the temperature, for example, from about 185° to about 180° F. while removing an overhead stream of chlorine and water vapor containing a major proportion of the chlorine dissolved in the brine. The partially dechlorinated brine is passed to the second stage for further dechlorination. Carry-over is separated from the overhead stream and combined with the residual brine. The overhead stream is then cooled and the condensate, containing dissolved chlorine, is returned to the outlet brine receiver immediately following the cells. The uncondensed chlorine and water vapor is injected into the steam jet producing the first stage vacuum. The steam condensate, containing the dissolved chlorine, is also returned to the outlet brine receiver. All of the chlorine thus recovered is returned to the chlorine recovery operation.

The partially dechlorinated brine is introduced into the flash chamber and the further operation is as described above in the single stage operation. It is an advantage of the two stage operation that the plate requirement and steam load in the rectifier are reduced when producing a dischargeable effluent of specified low free chlorine content.

Accompanying FIG. 1 provides a flow sheet illustrating the process of the invention. In cell 11, brine is electrolyzed to produce chlorine removed by line 12 and amalgam removed by line 13 to decomposer 14. In decomposer 14, the amalgam reacts with water introduced by line 15 to form hydrogen removed by line 16 and aqueous caustic removed by line 17. Denuded mercury is removed by line 18 and returned to cell 11. The chlorine-saturated brine is removed from cell 11 by line 19 to brine receiver 20. Chlorine disengaged in the brine receiver is removed by line 21 under control of valve 22 and combined with chlorine in line 12 and transferred to the chlorine recovery operation (not shown).

Brine removed from receiver 20 is passed by line 123 to flash chamber 42. The overhead therefrom is removed by line 43 to separator 44 and separated liquid phase is returned by line 45 to liquid line 46. The stream of chlorine and water vapor removed from separator 44 is transferred by line 47 to rectifier column 48 in which the bottoms are heated by steam lines 48A. Chlorine-free water is removed from rectifier column 48 by line 49 to storage 50 where it is neutralized and discharged to effluent by line 51. Water vapor and the remaining chlorine is removed from rectifier column 48 by line 52 to separator 53 which provides reflux to rectifier column 48 by line 54. Vacuum is produced by steam jet 55 supplied with steam by line 64 and operatively connected to separator 53 by line 56. Pressure is controlled by controller 57 which measures the pressure in rectifier column 48 by line 58 and operates valve 59 to admit air through line 60 to line 56 as necessary to maintain suitable pressure. Condensate from steam jet 55 containing dissolved chlorine passes by line 61 to condenser 62. Uncondensed gas from condenser 62 passes to steam jet 63 supplied with steam via line 65. Condensate from steam jet 63 is returned by line 166 to brine receiver 20. Condensate from condenser 62 is removed by line 67 to brine receiver 20. It is advantageous in some circumstances, in order to handle the volume of gases, to provide duplicate (not shown) of steam jet 55 and 63 and to arrange the duplicates in parallel with jets 55 and 63.

The liquid in line 46 is chlorine-free brine which is returned to weak brine tank 68. Weak brine is removed therefrom by line 69 to brine purification system 70. Purified brine is removed therefrom by line 71 to strong brine tank 72 for storage. Strong brine is transferred by line 73 to head tank 74, acidified by hydrochloric acid introduced by line 75. The acidified brine is fed to cell 11 by line 76.

Figure 2:
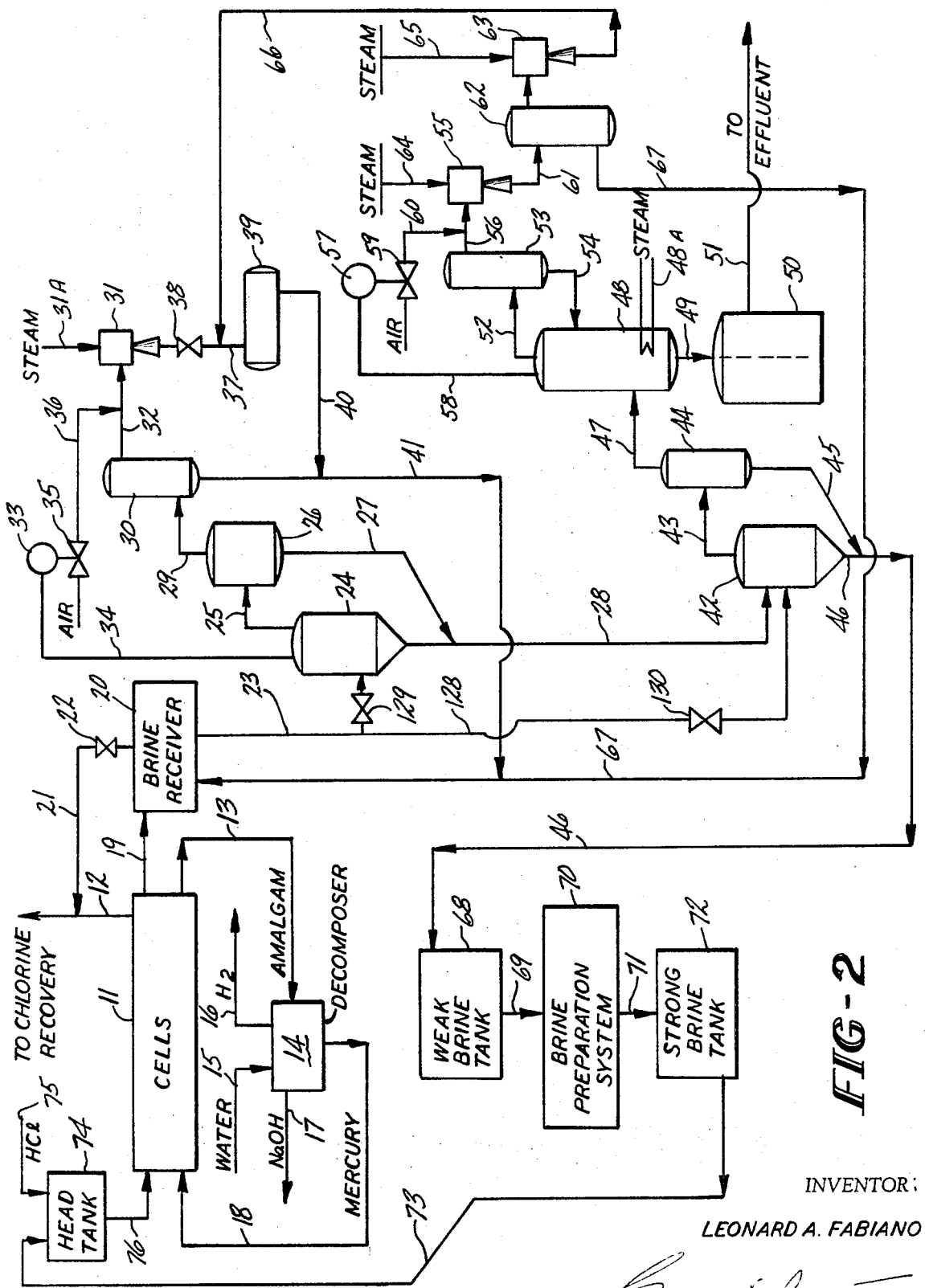

Accompanying FIG. 2 provides a flow sheet illustrating a modification of the process of the invention incorporating a preliminary partial dechlorination stage which relieves the plate requirement and steam load on rectifier column 48. Parts corresponding to the same parts in FIG. 1 are correspondingly numbered. The operation of the cells, amalgam decomposer and brine preparation system in FIG. 2 are the same as in FIG. 1.

In FIG. 2, in the preliminary stage of partial dechlorination, the brine is removed from receiver 20 and is passed by line 23 under control of valve 129 to vacuum dechlorinator 24. The overhead therefrom is removed by line 25 to separator 26 and the liquid phase is returned by line 27 to liquid line 28. A stream of chlorine and water vapor is removed by line 29 from separator 26 to condenser 30 which is supplied with cooling water (not shown). Vacuum is produced in dechlorinator 24, separator 26 and condenser 30 and associated lines by steam jet 31 supplied with steam by line 31A. Steam jet 31 is operatively connected to condenser 30 by line 32. The pressure in dechlorinator 24 is regulated by controller 33 which measures the pressure in dechlorinator 24 by line 34 and operates valve 35 to admit air through line 36 to line 32 as necessary to maintain suitable pressure. Condensate from steam jet 31 containing dissolved chlorine passes by line 37 under control of valve 38 to condenser 39. Condensate containing chlorine from condenser 39 is removed by line 40 and combined with condensate removed from condenser 30 in line 41 and returned to brine receiver 20.

Using the preliminary stage of partial dechlorination, partially dechlorinated brine from dechlorinator 24 is transferred by line 28 to flash chamber 42 and the second stage is operated as described in connection with FIG. 1. However, condensate from steam jet 63 is returned by line 66 and combined with condensate from first stage steam jet 31 in line 37.

For maximum flexibility, line 128 controlled by valve 130, is provided in FIG. 2 to by-pass the preliminary partial dechlorination stage. This by-pass is operated by closing valves 129 and 38 to isolate the preliminary stage and opening valve 130 to pass brine by lines 23 and 128 directly to flash chamber 42. The operation then reverts to essentially the system shown in FIG. 1.

EXAMPLE I

In a single stage operation substantially as shown in the accompanying FIG. 1, chlorine-containing brine at a temperature at 185° F. under atmospheric pressure was charged at a rate of 857,880 pounds per hour to a flash chamber operating at a pressure of 8.67 inches of mercury. The brine contained 23.6 percent of sodium chloride and 0.025 percent of dissolved chlorine. The liquid effluent from the flash chamber amounting to 844,550 pounds per hour of completely dechlorinated brine at a temperature of 166° F. was transferred to the weak brine tanks for fortification, purification, and recycle. The overhead from the flash chamber, containing about 220 pounds per hour of chlorine, passed through the separator to the chlorine rectifier column with the bottom temperature maintained at 137.5° F. and the pressure at 5.86 inches of mercury. The liquid effluent from the rectifier column was substantially pure water containing about 0.015 percent or 150 ppm of chlorine. This concentration is acceptable for discharge into rivers. Substantially all (99.3 percent) of the chlorine in the brine charged was recovered and returned to the brine receiver and eventually to the chlorine recovery system.

EXAMPLE II

In an operation substantially as shown in accompanying FIG. 2, chlorine-containing brine at a temperature at 185° F. under atmospheric pressure was charged at a rate of 857,880 pounds per hour to a first stage dechlorinator operating at a pressure of 12 inches of mercury. The brine contained 23.6 percent of sodium chloride and 0.025 percent of dissolved chlorine. With the separator operating at 180.5° F. under a pressure of 12 inches of mercury and the following condenser operating at 95° F. and 11.3 inches of mercury, about 211.5 pounds per hour of chlorine was dissolved in the steam jet condensate while 8.5 pounds per hour of chlorine was dissolved in the liquid effluent of the dechlorinator vapor condenser. The streams effluent from these two condensers were combined and recycled to the brine receiver while brine nearly free of chlorine from the dechlorinator was transferred to the flash chamber of the second stage. The liquid effluent from the flash chamber amounting to 844,550 pounds per hour of completely dechlorinated brine at a temperature of 166° F. was transferred to the weak brine tanks for fortification, purification, and recycle. The overhead from the flash chamber passed through the separator to the chlorine rectifier column with the bottom temperature maintained at 137.5° F. and the pressure at 5.86 inches of mercury. The liquid effluent from the rectifier column was substantially pure water containing about 0.015 percent or 150 ppm of chlorine. This concentration is acceptable for discharge into rivers. Substantially all (99.3 percent) of the chlorine in the brine charged was recovered and returned to the brine receiver and eventually to the chlorine recovery system.

What is claimed is:

1. In the vacuum dechlorination of acidic alkali metal chloride brine from a mercury cathode electrolytic cell, wherein steam exhaust is used to produce said vacuum, the improvement of:
   1. vaporizing overhead from said brine a stream of water and chlorine containing a major proportion of the chlorine dissolved in said brine;
   2. recycling the resulting dechlorinated brine to a brine preparation system for fortification, purification and reuse in said cell;
   3. fractionating said overhead stream of water and chlorine to provide a second overhead stream of water and chlorine and an aqueous bottom product containing less than 250 parts per million of chlorine;

4. condensing said second overhead stream of chlorine and water together with the condensate from the steam exhaust and recycling the resulting mixed condensates by combining them with acidic brine from said cells.

2. Method as claimed in claim 1 in which the pressure is maintained below about 10 inches of mercury and the temperature is from 100° to 180° F.

3. Method of dechlorination of acidic alkali metal chloride brine in two stages wherein the second stage is the method as claimed in claim 1 and the first stage is a preliminary stage wherein the steps are:

a. vaporizing overhead from said brine from said cells a stream of water and chlorine containing a major proportion of the chlorine dissolved in said brine;

b. condensing said overhead stream of chlorine and water together with the condensate from the steam exhaust and recycling the resulting mixed condensates by combining them with said acidic brine from said cells;

c. charging the resulting partially dechlorinated brine to said second stage.

4. Method as claimed in claim 3 in which the pressure in said first stage is below about 14 inches of mercury.

* * * * *